United States Patent
Merli et al.

(10) Patent No.: US 10,781,358 B2
(45) Date of Patent: Sep. 22, 2020

(54) PROCESS FOR THE CLEANING OIL AND GAS WELLBORES

(71) Applicant: Lamberti S.p.A., Albizzate (IT)

(72) Inventors: Luigi Merli, Saronno (IT); Letizia Privitera, Sumirago (IT); Lorenzo Giardini, Casella (IT); Pierangelo Pirovano, Comerio (IT); Giovanni Floridi, Novara (IT); Giuseppe LiBassi, Gavirate (IT)

(73) Assignee: Lamberti SPA, Albizzate (IT)

( * ) Notice: Subject to any disclaimer, the term of this patent is extended or adjusted under 35 U.S.C. 154(b) by 140 days.

(21) Appl. No.: 15/898,494

(22) Filed: Feb. 17, 2018

(65) Prior Publication Data

US 2019/0093001 A1    Mar. 28, 2019

(51) Int. Cl.
| | |
|---|---|
| *E21B 37/06* | (2006.01) |
| *C09K 8/528* | (2006.01) |
| *C09K 8/52* | (2006.01) |
| *C09K 8/524* | (2006.01) |
| *E21B 37/00* | (2006.01) |

(52) U.S. Cl.
CPC ............... *C09K 8/528* (2013.01); *C09K 8/52* (2013.01); *C09K 8/524* (2013.01); *E21B 37/00* (2013.01); *E21B 37/06* (2013.01); *C09K 2208/20* (2013.01); *C09K 2208/22* (2013.01)

(58) Field of Classification Search
None
See application file for complete search history.

(56) References Cited

U.S. PATENT DOCUMENTS

| | | | |
|---|---|---|---|
| 3,932,296 A | 1/1976 | Byth | |
| 5,126,059 A * | 6/1992 | Williamson | C09K 8/536 166/307 |
| 5,874,386 A | 2/1999 | Chan et al. | |
| 6,534,449 B1 | 3/2003 | Gilmour et al. | |
| 6,630,428 B1 | 10/2003 | Furman et al. | |
| 2012/0241155 A1 | 9/2012 | Ali et al. | |
| 2014/0187449 A1* | 7/2014 | Khabashesku | C09K 8/524 507/90 |
| 2014/0262280 A1 | 9/2014 | Hill | |
| 2015/0315876 A1 | 11/2015 | Dyer | |

FOREIGN PATENT DOCUMENTS

CN    1202922 A    12/1998

OTHER PUBLICATIONS

European Search Report on European Application No. 18 153 731.7 dated Mar. 29, 2018.

* cited by examiner

*Primary Examiner* — Andrew Sue-ako
(74) *Attorney, Agent, or Firm* — Iona Niven Kaiser; Vorys, Sater, Seymour and Pease LLP

(57) ABSTRACT

Cleaning composition for use in cleaning wellbore walls, tubing or casing comprising: (i) from about 5% to 100% by weight of a mixture M consisting of from 10% to 50% by weight of acetophenone, from 5% to 30% by weight of butyl glycol and from 40% to 80% by weight of a surfactant, and (ii) from 0% to 95% by weight of water, in which (i)+(ii) sum up for at least 85% by weight of the cleaning composition; and process for cleaning a wellbore wall.

2 Claims, No Drawings

PROCESS FOR THE CLEANING OIL AND GAS WELLBORES

CLAIM OF PRIORITY

This application claims priority under 35 U.S.C. § 365(c) of Italian patent application no. IT 102017000017880 filed on Feb. 17, 2017.

BACKGROUND OF THE INVENTION

1. Technical Field

The present invention relates to a process for the cleaning of The present invention particularly relates to a process for the cleaning of wellbore wall, tubing and casing using cleaning compositions comprising butyl glycol (2-butoxyethanol) and acetophenone.

2. Background of the Invention

An effective cleanout operation is important during drilling and workover of an oil or gas well, and for an acidizing treatment of a geological formation, and to secure the establishment of an effective bond between a cement composition and a wellbore wall or tubing or casing, in order to avoid undesirable results in oil and gas well operations.

This is because, by way of example, an ineffective cleanout operation during drilling or workover of an oil well can result in damage where contamination and even plugging occurs at the formation from which there is intention to produce fluids.

Similarly, where an acidizing treatment of a formation is intended to increase the productivity of the formation, in the case that oil-based contaminants are not removed from the wellbore zone adjacent to the formation interval, there can be a reduction in the effectiveness of the acidizing treatment.

Moreover, poor cleaning of the wellbore wall, casing, liner or tubing string, can reduce the quality of the cement bonding during cementing operations, and therefore permit undesirable flow of fluids along the wellbore, or undesirable interconnection between separate formations zones, or undesirable fluid flow around the casing, or a failure to stabilize the casing in the wellbore.

Remedial action for any of the above-mentioned problems, or resulting contamination of a formation interval, can incur substantial costs in both onshore and offshore well operations.

Cleaning compositions comprising surfactants and organic solvents are commonly used in the field on surfaces to be cleaned, such as the well surfaces when displacement of a drilling fluid with a spacer fluid shall be accomplished.

Before use, cleaning compositions are usually diluted with locally available water, which is possibly viscosified by addition of suitable polysaccharide-based, or other, viscosifiers and injected into to the well.

A great number of cleaning composition have been described in patent documents. By way of example we cite:

U.S. Pat. No. 5,874,386, describing aqueous surfactant compositions comprising alkyl polyglycosides, ethoxylated alkyl alcohols and/or ethoxylated phenols, alkyl alcohols and alkali;

U.S. Pat. No. 6,630,428, describing cleaning compositions comprising fatty acid alkyl ester blend and lower alkyl glycol ether(s);

U.S. Pat. No. 6,534,449, describing a method of reducing oil-containing residue on a wellbore surface with a wellbore fluid composition comprising a terpene composition and surfactant and with an aqueous fluid comprising a viscosifying organic polymer and wetting surfactant.

U.S. Patent App. Pub. No. 2012/0241155, describing wellbore cleaning compositions comprising microemulsions in which the solvent may be selected from the group comprising methyl esters and ethoxylated alcohols and the surfactants comprise a water-wetting surfactant, a cleaning surfactant, an emulsifying surfactant, a non-ionic surfactant and a non-ionic co-surfactant;

U.S. Patent App. Pub. No. 2015/0315876, describing cleaning emulsions comprising of water, hydrocarbon solvent, terpene hydrocarbon material, demulsifier, detergent and optionally an acid.

Notwithstanding the improvements in well cleanout operations described in these patents, there continues to be a need to provide a cleanout composition which maintains or improves on the characteristics needed for cleaning and that has good toxicological and environmental properties, in line with legislation governing the use of chemicals in the oil and gas industry, and especially for offshore operations.

SUMMARY OF THE INVENTION

In one aspect, the present invention is a cleaning composition for use in cleaning wellbore walls, tubing or casings comprising (i) from about 5% to 100% by weight of a mixture M consisting of from 10% to 50% by weight of acetophenone, from 5% to 30% by weight of butyl glycol and from 40% to 80% by weight of a surfactant and (ii) from 0% to 95% by weight of water, in which (i)+(ii) sum up for at least 85% by weight of the cleaning composition.

In another aspect, the present invention is a process for cleaning a wellbore wall, tubing or casing characterized by: (a) preparing a cleaning composition comprising (i) from about 5% to 100% by weight of a mixture M consisting of from 10% to 50% by weight of acetophenone, from 5% to 30% by weight of butyl glycol and from 40% to 80% by weight of a surfactant and (ii) from 0% to 95% by weight of water in which (i)+(ii) sum up for at least 85% by weight of the cleaning composition; (b) injecting the cleaning composition, possibly diluted in water, into a wellbore or tubing or casing containing drilling mud residues, oily residues or other undesirable deposits to provide an aqueous wellbore cleaning fluid; (c) extracting from the wellbore or tubing or casing the aqueous wellbore cleaning fluid containing the drilling mud residues, oily residues or other undesirable deposits.

DETAILED DESCRIPTION OF THE INVENTION

In a preferred embodiment, the cleaning composition comprises (i) from about 20% to about 50% by weight of a mixture M consisting of from 20% to 40% by weight of acetophenone, from 10% to 20% by weight of butyl glycol and from 50% to 70% by weight of a surfactant and (ii) from 50% to 80% by weight of water and (i)+(ii) sum up for at least 90% by weight of the cleaning composition.

In a more preferred embodiment, the cleaning composition comprises (i) from about 30% to about 40% by weight of a mixture M consisting of from 25% to 35% by weight of acetophenone, from 10% to 20% by weight of butyl glycol and from 50% to 70% by weight of a surfactant and (ii) from 50% to 80% by weight of water and (i)+(ii) sum up for at least 95% by weight, most preferably for 100% by weight of the cleaning composition; according to the preferred embodiments, the cleaning compositions are stable monophase fluids (i.e. they do not separate multiple phases upon storage at 25° C. for 8 months) and meet the specific performance requirements, specifically in terms of cleaning ability, compatibility with other substances used in the cleaning system and compliance with environmental legislation.

In another advantageous embodiment, the amount of water in the cleaning composition is from 0% to 5% by weight, or from 0% to 10% by weight.

Although other cleaning composition comprising organic solvents with poor solubility in water (below 10 g/L), water miscible glycols and surfactants have been described in the literature, it has surprisingly been found that the combination of acetophenone, butyl glycol and surfactants, particularly in the above described preferred and most preferred embodiments, is economically advantageous, shows excellent cleaning performance, homogeneity and good stability.

Moreover, the flash point (Fp) of acetophenone, 77° C., is much higher than the flash point of the most common monoterpenes, D-limonene (Fp 50° C.) and alpha-pinene (Fp 33° C.), and of many other organic solvents that have been proposed for use in wellbore fluids, such as xylenes (Fp about 30° C.), ethyl acetate (−4° C.), methyl ethyl ketone (Fp −1° C.), which renders safer the cleaning compositions of the invention.

In the cleaning composition, non-ionic, anionic, cationic, and ampholytic surfactants can be used as the surfactant. Mixtures of different surfactants may be used.

Suitable surfactants are, for example, nonionic emulsifiers and dispersants, such as: polyalkoxylated, preferably polyethoxylated, saturated or unsaturated aliphatic alcohols, having 8 to 24 carbon atoms in the alkyl radical and having 1 to 100, preferably 4 to 40, ethylene oxide moles (EO); polyalkoxylated, preferably polyethoxylated, arylalkylphenols, such as, for example, tristyrylphenol having an average degree of ethoxylation of between 8 and 80, preferably from 16 to 40; polyalkoxylated, preferably polyethoxylated, alkylphenols having one or more alkyl radicals, such as, for example, nonylphenol or tri-sec-butylphenol, and a degree of ethoxylation of between 2 and 40, preferably from 4 to 20; polyalkoxylated, preferably polyethoxylated, hydroxy-fatty acids or glycerides of hydroxy-fatty acids, such as, for example, castor oil, having a degree of ethoxylation of between 10 and 80; sorbitan or sorbitol esters with fatty acids or polyalkoxylated, preferably polyethoxylated, sorbitan or sorbitol esters; polyalkoxylated, preferably polyethoxylated, amines; di- and tri-block copolymers, for example from alkylene oxides, for example from ethylene oxide and propylene oxide, having average molar masses between 200 and 8000 g/mol, preferably from 1000 to 4000 g/mol; alkylpolyglycosides or polyalkoxylated, preferably polyethoxylated, alkylpolyglycosides.

Preferred nonionic surfactants are alkylpolyglucosides having 8 to 24, more preferably 8 to 12, carbon atoms in the alkyl radical.

Other preferred anionic surfactants are 8-12 moles ethoxylated C8-C18 fatty alcohols.

Also suitable are anionic surfactants, for example: polyalkoxylated, preferably polyethoxylated, surfactants which are ionically modified, for example by conversion of the terminal free hydroxyl function of the alkylene oxide block into a sulfate or phosphate ester; alkali metal and alkaline earth metal salts of alkylarylsulfonic acids having a straight-chain or branched alkyl chain; alkali metal and alkaline earth metal salts of paraffin-sulfonic acids and chlorinated paraffin-sulfonic acids; polyelectrolytes, such as lignosulfonates, condensates of naphthalenesulfonate and formaldehyde, polystyrenesulfonate or sulfonated unsaturated or aromatic polymers; anionic esters of alkylpolyglycosides, such as alkylpolyglucosides sulfosuccinate, tartrate or citrate; sulfosuccinates which are esterified once or twice with linear, or branched aliphatic, cycloaliphatic and/or aromatic alcohols, or sulfosuccinates which are esterified once or twice with (poly)alkylene oxide adducts of alcohols.

Preferred anionic surfactants are anionic esters of alkylpolyglycosides, in particular alkylpolyglucosides citrate, tartrate and sulfosuccinate, having 8 to 24, more preferably 8 to 12, carbon atoms in the alkyl radical.

Other preferred anionic surfactants are 8-12 moles ethoxylated C8-C18 fatty alcohols, sulfate.

Examples of cationic and ampholytic surfactants are quaternary ammonium salts, alkyl amino acids, and betaine or imidazoline amphotensides.

When considering cleaning compositions used in wellbore cleaning operations, particularly important is their toxicity to aquatic organisms, especially those low in the food chain, because of the possibility of accidental or wilful discharge into the marine environment of the cleaning compositions, or of fluids contaminated with the cleaning compositions. For this reason, the cleaning compositions are preferably formulated with surfactants having a favorable marine and aquatic eco-toxicological profile. Therefore, the use of the above described alkylpolyglucosides and alkylpolyglucosides esters is particularly advantageous because it combines excellent cleaning performances while providing eco-toxicological advantages over the use of other surfactants.

Cleaning compositions, for oil and gas well use, are generally commercially supplied as relatively concentrated products and are normally diluted with locally available water before use. In the preferred embodiments of the invention, the cleaning compositions are diluted with water before being injected into the wellbore. The water may be hard or soft, or may be sea water when the supply of fresh water is severely limited. Brines may also be used to dilute the cleaning compositions before injection.

In the process for cleaning a wellbore wall, tubing or casing, the cleaning composition may be injected as such or diluted in water or in an aqueous fluid before being injected into the wellbore, tubing or casing; alternatively, the cleaning composition may be diluted in situ in an aqueous fluid already present in the wellbore, tubing or casing. The removal of drilling mud residues, oily residues or other undesirable deposits is made by the mixture M in the resulting (cleaning fluid, in which, typically, the mixture M represents from 0.5 to 20% by weight, preferably from 1 to 10% by weight, more preferably from 3 to 8% by weight.

The cleaning compositions can be prepared by simply mixing the various components.

Optionally, the cleaning composition also includes minor amounts of other chemicals as additional ingredients, such as organic solvents (different from acetophenone and butyl glycol), corrosion inhibitors, microbial inhibitors, pH adjusters, anti-foam agents, inorganic salts and mixture thereof, the amount of additional ingredients being at most 15% by weight of the composition.

Preferably, the amount of organic solvents different from acetophenone and butyl glycol in the cleaning composition is at most 10% by weight of the mixture M, more preferably at most 5% by weight; most preferably no organic solvents different from acetophenone and butyl glycol are present in the cleaning composition.

Examples of organic solvents that can be present in the cleaning composition are glycols, polyglycols and glycol ethers such as polyethylene glycol, polypropylene glycol, ethylene glycol, propylene glycol, diethylene glycol, dipropylene glycol, polyethylene glycol monomethylether, polypropylene glycol monomethylether, ethylene glycol monomethylether, propylene glycol monomethylether, diethylene glycol monomethylether, dipropylene glycol monomethylether, polyethylene glycol dimethylether, polypropylene glycol dimethylether, ethylene glycol dimethylether, propylene glycol dimethylether, diethylene glycol dimethylether, dipropylene glycol dimethylether; toluene, xylene, mineral oil, linear alpha olefin, internal olephin, paraffin, ethyl acetate, butyl lactate, cyclohexanone, and monoterpene, such as D-limonene and alpha-pinene.

The compositions of the present invention may also be applied in pipeline cleaning or pigging operations, for gravel pack or fracture cleaning fluids for wells, in aqueous spacer fluids, corrosion inhibitor fluids, wetting agents for cement slurries, as well as in other cleaning operations which are associated with hydrocarbon production and transport. These compositions are most useful for wellbore cleanout operations when the salinity and temperature involved with cleanout will not result in degradation of the composition or loss of its effectiveness.

The fluid remaining in a wellbore after completion of the drilling and casing process may well contain a significant amount of brine. Thus any cleaning composition used should be stable over a relatively wide range of temperatures, be tolerant of both caustic and acidic fluid compositions, and be tolerant over a relatively wide range of fluid salinity. The cleaning compositions in accordance with the present invention exhibit these properties in the conditions used in field applications.

It is known to those skilled in the art that cleaning regimes where a cleaning agent flows over a surface to be cleaned can be divided into laminar flow or turbulent flow regimes, where turbulent flow usually has an advantage of increasing the cleaning efficiency.

To promote a turbulent flow regime, those skilled in the art often will use the cleaning compositions, which are commercially supplied as concentrated products, and dilute them with locally available fresh water, which is viscosified by addition of commercial grades of suitable viscosifiers.

The cleaning compositions of the present invention are useful for operating both in laminar flow and in turbulent flow regime.

EXAMPLES

Preparation of the Cleaning Compositions.

The cleaning compositions according to the invention (Cleaning Compositions 1 and 11-14) have been prepared by mixing the ingredients listed in Table 1 and 2, where amounts are in weight percentages.

Comparative cleaning compositions have also been prepared (Cleaning Compositions 2-10)

All the cleaning compositions according to the invention are stable. i.e. they do not separate in multiple phases upon storage at 25° C. for 8 months.

Cleaning Tests

The cleaning compositions have been tested on residues of water in oil drilling fluids whose compositions are reported in Tables 3 and 4.

The cleaning compositions, diluted at 10% in water, are tested using the following method, performed at room temperature. A rotating vertical steel cylinder about 4 cm in diameter is used to emulate drilling equipment and is immersed to a depth of about 4 cm into the test drilling fluid at ambient temperature while rotating the cylinder at 600 rpm for one minute. The rotation is stopped and the cylinder removed from the drilling fluid and left stationary for another 30 seconds. The cylinder is then immersed to a depth of about 4 cm into the diluted solution of the cleaning composition being tested kept at 100° F. (38° C.) while continuously rotating the cylinder at 300 rpm.

At intervals of one minute after immersion the cylinder is inspected visually by the operator and the appearance of the cylinder is recorded using the following numerical scale:

5—no effect
4—some drilling fluid has been removed
3—more drilling fluid has been removed but the cylinder is still substantially covered with drilling fluid
2—the drilling fluid is partly removed from the cylinder
1—almost all the drilling fluid has been removed from the cylinder
0—the cylinder is free of drilling fluid and is now clean.

The results of the cleaning test for the cleaning compositions of Table 1 and 2 are respectively reported in Table 5 and 6.

TABLE 1

| | Cleaning compositions | | | | | | | | | |
|---|---|---|---|---|---|---|---|---|---|---|
| | Cleaning Composition | | | | | | | | | |
| Ingredients | 1 | 2* | 3* | 4* | 5* | 6* | 7* | 8* | 9* | 10* |
| Acetophenone | 10.0 | | | | | 10.0 | 10.0 | | 10.0 | 10.0 |
| Xylene | | 10.0 | | | | | | | | |
| Solvesso 100[1] | | | 10.0 | | | | | | | |
| Cyclohexanone | | | | 10.0 | | | | | | |
| n-Butyl L-lactate[2] | | | | | 10.0 | | | | | |
| D-limonene | | | | | | | | | 10.0 | |
| Butyl glycol | 5.0 | 5.0 | 20.0 | 5.0 | 5.0 | | | 5.0 | | |
| Butyldiglycol | | | | | | 5.0 | | | | |
| Butyltriglycol | | | | | | | 5.0 | | | |
| Isopropyl alcohol | | | | | | | | | 20.0 | |
| DPM[3] | | | | | | | | | | 20.0 |
| APG[4] (a.m.) | 21.0 | 21.0 | 21.0 | 21.0 | 21.0 | 21.0 | 21.0 | 21.0 | 21.0 | 21.0 |
| Water | | | | | in each composition to 100 | | | | | |

TABLE 1-continued

Cleaning compositions

| Ingredients | Cleaning Composition | | | | | | | | | |
|---|---|---|---|---|---|---|---|---|---|---|
| | 1 | 2* | 3* | 4* | 5* | 6* | 7* | 8* | 9* | 10* |

[1] EXXON Mobil Chemical
[2] Purasolv ®BL, Corbion Purac
[3] Dipropylene glycol methyl ether (Dowanol ® DPM, Dow)
[4] $C_8$-$C_{10}$ alkylglucoside 70% a.m. in water
*comparative

TABLE 2

Cleaning compositions

| Ingredients (a.m.) | Cleaning composition | | | | |
|---|---|---|---|---|---|
| | 1 | 11 | 12 | 13 | 14 |
| Acetophenone | 10.0 | 10 | 10 | 10 | 10 |
| Butyl glycol | 5.0 | 5.0 | 5.0 | 5.0 | 5.0 |
| APG | 21.0 | | | | |
| $C_{12}$-$C_{15}$ alcohol ethoxylated 9 moles, ammonium sulfate | | 21.0 | | | |
| Isotridecyl alcohol ethoxylated 9 moles | | | 21.0 | | |
| Cocoamidopropyl betaine | | | | 21.0 | |
| Water | to 100 | to 100 | to 100 | to 100 | to 100 |

TABLE 3

Drilling fluid 1

| Ingredient: | Ingredient Description | Amount in grams |
|---|---|---|
| EDC 95-11[1] | C15-C20 hydrocarbon oil | 123.6 |
| EMULAM PE[2] | Primary Emulsifier | 7 |
| EMULAM SE[2] | Secondary Emulsifier | 10 |
| Lime | pH adjuster | 20 |
| Natural Asphalt | Fluid Loss Reducer | 12 |
| Fresh water | | 33.5 |
| CaCl$_2$ aq. sol. 37.4% | Brine | 20 |
| EMULAM V PLUS[2] | Viscosifier | 3.5 |
| Barite | Weighting agent | 500 |
| API standard evaluation base clay | Standard kaolin | 35 |

[1] From Total Special Fluids
[2] From Lamberti SpA, Italy

TABLE 4

Drilling fluid 2

| Ingredient: | Ingredient Description | Amount in grams |
|---|---|---|
| Mineral Oil | Oil | 148 |
| EMULAM PE[1] | Primary Emulsifier | 10 |
| EMULAM SE[1] | Secondary Emulsifier | 6 |
| Lime | pH adjuster | 6 |
| Distilled water | | 80 |
| CaCl$_2$ brine 26% | Brine | 28.4 |
| EMULAM V PLUS[1] | Viscosifier | 8 |
| NATURAL ASPHALT | Fluid Loss Reducer | 8 |
| Barite | Weighting agent | 209.8 |

[1] From Lamberti SpA, Italy

TABLE 5

Test results with Drilling Fluid 1

| minutes | Cleaning compositions | | | | | | | | | |
|---|---|---|---|---|---|---|---|---|---|---|
| | 1 | 2* | 3* | 4* | 5* | 6* | 7* | 8* | 9* | 10* |
| 1 | 4 | 5 | 5 | 5 | 4 | 4 | 4 | 5 | 4 | 4 |
| 2 | 4 | 4 | 4 | 4 | 4 | 3 | 4 | 5 | 3 | 3 |
| 3 | 4 | 4 | 3 | 4 | 3 | 3 | 3 | 4 | 3 | 3 |
| 4 | 3 | 3 | 3 | 4 | 3 | 3 | 3 | 4 | 3 | 3 |
| 5 | 3 | 3 | 3 | 4 | 3 | 3 | 3 | 4 | 3 | 3 |
| 6 | 3 | 3 | 3 | 3 | 2 | 3 | 3 | 3 | 3 | 3 |
| 7 | 2 | 2 | 3 | 3 | 2 | 3 | 3 | 3 | 3 | 3 |
| 8 | 1 | 2 | 3 | 3 | 2 | 3 | 3 | 3 | 3 | 3 |
| 9 | 1 | 2 | 3 | 3 | 2 | 3 | 3 | 3 | 3 | 3 |
| 10 | 1 | 2 | 3 | 3 | 2 | 3 | 3 | 3 | 3 | 3 |

*comparative

TABLE 6

Test results with Drilling Fluid 2

| minutes | Cleaning composition | | | |
|---|---|---|---|---|
| | 1 | 11 | 12 | 13 |
| 1 | 2 | 4 | 3 | 3 |
| 2 | 0 | 3 | 2 | 2 |
| 3 | 0 | 2 | 1 | 1 |
| 4 | 0 | 1 | 1 | 1 |
| 5 | 0 | 0 | 1 | 1 |

We claim:

1. A process for cleaning a wellbore wall, tubing or casing comprising the steps of: (a) preparing a cleaning composition comprising (i) from about 5% to 100% by weight of a mixture M consisting of from 10% to 50% by weight of acetophenone, from 5% to 30% by weight of butyl glycol and from 40% to 80% by weight of a surfactant and (ii) from 0% to 95% by weight of water in which (i)+(ii) sum up for at least 85% by weight of the cleaning composition; (b) injecting the cleaning composition into a wellbore or tubing or casing containing drilling mud residues, oily residues or other undesirable deposits to provide an aqueous wellbore cleaning fluid; (c) extracting from the wellbore or tubing or casing the aqueous wellbore cleaning fluid containing the drilling mud, oily residues or other undesirable deposits.

2. The process according to claim 1 in which the cleaning composition is i) injected as such or ii) diluted in water or in aqueous fluid before being injected into the wellbore, tubing or casing or iii) diluted in situ in an aqueous fluid already present in the wellbore, tubing or casing, in each case to provide a cleaning fluid, in which the mixture M represents from 0.5 to 20% by weight of the cleaning fluid.